(12) United States Patent
Xiang et al.

(10) Patent No.: US 12,179,450 B2
(45) Date of Patent: Dec. 31, 2024

(54) PREPARATION METHOD OF PTFE-BASED NANO FUNCTIONAL COMPOSITE MEMBRANE AND USE

(71) Applicants: CHINA THREE GORGES CORPORATION, Beijing (CN); CHINA THREE GORGES RENEWABLES (GROUP) CO., LTD., Beijing (CN); NANJING HAOHUI HI TECH CO., LTD., Jiangsu (CN)

(72) Inventors: Xin Xiang, Beijing (CN); Jianping Liu, Beijing (CN); Jianhua Wu, Jiangsu (CN); Zhiyu Sun, Beijing (CN); Yawei Zhu, Jiangsu (CN); Wenwei Li, Beijing (CN); Zhengfeng Shuai, Beijing (CN); Hong Wu, Jiangsu (CN); Jingxin Zhao, Jiangsu (CN); Jinquan Zhao, Beijing (CN); Jianping Wu, Jiangsu (CN)

(73) Assignees: CHINA THREE GORGES CORPORATION (CN); CHINA THREE GORGES RENEWABLES (GROUP) CO., LTD. (CN); NANJING HAOHUI HI TECH CO., LTD. (CN)

( * ) Notice: Subject to any disclaimer, the term of this patent is extended or adjusted under 35 U.S.C. 154(b) by 0 days.

(21) Appl. No.: 17/633,348

(22) PCT Filed: Dec. 15, 2020

(86) PCT No.: PCT/CN2020/136609
§ 371 (c)(1),
(2) Date: Feb. 7, 2022

(87) PCT Pub. No.: WO2022/011963
PCT Pub. Date: Jan. 20, 2022

(65) Prior Publication Data
US 2023/0330956 A1    Oct. 19, 2023

(30) Foreign Application Priority Data
Nov. 5, 2020    (CN) .......................... 202011220491.2

(51) Int. Cl.
*B29D 99/00*    (2010.01)
*B29C 43/24*    (2006.01)
(Continued)

(52) U.S. Cl.
CPC ............ *B29D 99/0028* (2013.01); *B32B 7/12* (2013.01); *B32B 27/08* (2013.01); *B32B 27/322* (2013.01);
(Continued)

(58) Field of Classification Search
CPC ........ B29D 99/0028; B29D 7/01; B32B 7/12; B32B 27/08; B32B 27/322; B32B 27/32;
(Continued)

(56) References Cited

FOREIGN PATENT DOCUMENTS

CN    106313811 A * 1/2017

OTHER PUBLICATIONS

Taketo Kitamura, Shohei Okabe, Masataka Tanigaki, Ken-Ichi Kurumada, Masahiro Ohshima, and Shin-Ichi Kanazawa. "Morphology Change in Polytetrafluoroethylene (PTFE) Porous Membrane Caused by Heat Treatment". Polymer Engineering and Science, Mar. 2000, vol. 40 No. 3. (Year: 2000).*

* cited by examiner

*Primary Examiner* — Alex B Efta
*Assistant Examiner* — Alexander S Wright

(57) ABSTRACT

A preparation method of a polytetrafluoroethylene (PTFE)-based nano functional composite membrane and use is
(Continued)

provided. The PTFE-based nano functional composite membrane can be applied to prevention and resistance of icing of various types of wind turbine generator blades in winter and salt spray corrosion resistance of wind turbine blades, in the meantime, can improve the aerodynamic performance of wind turbine blade airfoils and enhance the whole surface strength of the blade and protect the blade from undergoing aging erosion, and is a new-generation multi-functional brand-new composite membrane material which can be directly explored and applied to the industrial fields of preventing adhesion and corrosion of marine fouling organisms on steel pipe piles of offshore wind power and offshore platforms, avoiding snowing and icing of high-voltage transmission towers and cables, protecting snowing and icing of bridges (stay cables and suspension cables) and the like.

10 Claims, 5 Drawing Sheets

(51) Int. Cl.
*B29K 27/18* (2006.01)
*B29L 31/08* (2006.01)
*B32B 7/12* (2006.01)
*B32B 27/08* (2006.01)
*B32B 27/32* (2006.01)
*C09J 7/24* (2018.01)
*C09J 7/38* (2018.01)

(52) U.S. Cl.
CPC .................. *C09J 7/24* (2018.01); *C09J 7/381* (2018.01); *B29C 43/24* (2013.01); *B29K 2027/18* (2013.01); *B29L 2031/085* (2013.01); *B32B 2603/00* (2013.01)

(58) Field of Classification Search
CPC ..... B32B 2603/00; B32B 33/00; B32B 37/12; B32B 37/1292; C09J 7/24; C09J 7/381; B29C 43/24; B29K 2027/18; B29K 2995/0072; B29L 2031/085; Y02E 10/72; B23B 33/00
See application file for complete search history.

Membrane surface before treatment

Membrane surface after treatment bonding of cut membranes on the tip of the blade Winding and bonding of membrane Membrane bonding
between the membranes Membrane bonding at linkers Membrane bonding tool Spread of membranes

PREPARATION METHOD OF PTFE-BASED NANO FUNCTIONAL COMPOSITE MEMBRANE AND USE

FIELD

The disclosure relates to the technical field of polymer composites, particularly to a preparation method of a polytetrafluoroethylene (PTFE)-based nano functional composite membrane and use.

BACKGROUND

"Green and harmonious" wind power is a clean energy with huge resource potential and basically mature technology, and plays important roles in optimization of an energy structure, reduction and emission of greenhouse gases, tackling of climate change and the like. China is the first country having a wind power installed capacity of more than 200 million kilowatts all over the world. Obviously, wind power has been a core of propelling energy transformation in China, an important way to tackle climate change, a significant measure to implement ecological priority and green development, and an important means to deeply advance the revolution of energy production and consumption and promote the prevention and control of atmospheric contamination in China.

However, halting events caused by icing of wind turbine blades caused by cold climate and snow and ice disasters commonly occur. Relevant data show that under special weather conditions, for example when a temperature is close to 0° C. accompanied with high humidity such as freezing rain or rain and snow mixed, the wind turbine blades are easily covered by ices. The Germany Ender company (Nordex) investigates climates in Europe and North America and finds that regions with a temperature of less than 0° C. account for about half of the areas of Europe and North America, the wind turbine blades in Europe inland and the North Sea and east of the United Kingdom are all seriously iced during about one month in winter each year. There is obvious winter icing in Alps territory, and there is an icing phenomenon in winter in Eastern Europe. The west coast of North America is affected by California cold current to cause that there are serious icing problems in California, Oregon and other regions which have the most installed capacity in the United States. In the Great Lakes region of the United States, the wind turbine is obviously iced in winter due to high humidity of lake breeze.

China is the largest wind power installation country in the world, which similarly has a fairly outstanding icing problem existing on the surface of the wind turbine blade. There is an obvious wind turbine blade icing phenomenon in regions such as Northern Xinjiang, Inner Mongolia, mountainous areas in northern Hebei, Northwest Shanxi, northeast, Yunnan, Guizhou, Sichuan, Chongqing, Hubei, Hunan and Jiangxi in all winter. For wind turbine generators located in cold climate regions and high mountain forest regions, due to high ambient air humidity combined with low temperature in winter and large day and night temperature difference, the end of November to February-March of the next year, especially the cold weather in late spring in southern China, is a frequent period of blade icing. Whenever there is snow and rain mixed weather, the temperature is about 0° C. and the snowfall is thick, parts exposed to the external, such as wind turbine blades and anemometers, can be wrapped with a large amount of wet rain and snow mixtures, with a local thickness being more than 10 cm. As the temperature decreases, the rain and snow mixture on the wind turbine blade begins to be iced, and an output from the wind turbine gradually decreases to lead to a fact that a normal output at this wind speed cannot be reached. In particular, the icing time and icing degree of the wind turbine blades in high altitude mountain areas and forest regions, such as Hunan, Hubei, Guangdong, Jiangxi, Zhejiang, Anhui and Yunnan Guizhou Plateau, is relatively serious compared with those in Northern Xinjiang, Inner Mongolia, mountainous areas of northern Hebei, Northwest Shanxi and Northeast regions.

The region, having the most ices, of the wind turbine blade is focused on its windward side, and the icing deposition on the tip of the blade is greater than that at the root of the blade, the uneven load accumulated by icing and icing sections with different thickness makes the original airfoil of the blade change, and then affects the output power of the wind turbine generator.

The hazards of wind turbine blade icing are summarized as follows: static and dynamic unbalanced loads are increased, the too large vibration of the wind turbine generator is possibly caused, the inherent frequency of the blade is changed, the fatigue load is increased, the bending moment of the blade is increased and personal safety is endangered. Solving the problem of blade icing is an important subject in a wind power industry all over the world. This problem can be effectively solved through scientific and technological innovation, which is the fundamental to implement the dual promotion of wind power efficiency and safety.

Foreign scientific research institutions and wind power industry have been conducting relevant researches on ice preventing and removing technical materials for wind turbine blades. It is found by retrieving foreign authoritative databases, relevant websites and public literatures that Japanese patent JP2003113254 invents a wind power blade coating. In this patent, polyfluoroethylene, polyvinylidene fluoride, dry ice, carbon powder, tung oil, polyvinyl formal, polyetherimide, straw powder, a preservative, a dispersant, a leveling agent and the like are used as raw materials to form a porous super-hydrophobic polyvinylidene fluoride membrane coating in order to achieve good anti-icing efficiency. World patent WO2006058233 discloses a self-cleaning anti-reflection membrane compounded by homogeneous double-layer SiO2 (silica) and polytetrafluoroethylene and a preparation method for icing prevention of blades. This antireflection membrane is compounded by a dense silica layer, a porous silica nano rod layer and a polytetrafluoroethylene nano rod. The preparation method of the antireflection membrane is as follows: three layers of dense silica, porous silica and PTFE nano rod composite membranes with gradually reduced refractive indexes are successively deposited on a transparent or semitransparent substrate by using an electron beam evaporation method. U.S. patent US20170028361 discloses a PFSA/PTFE composite membrane for icing prevention of blades, comprising: dissolving a perfluorosulfonic acid substance with an aqueous solution of a low-boiling-point organic alcohol solvent; then, adding a high-boiling-point organic solvent and silica sol into the solution to prepare a resin solution for preparing the membrane; the membrane-forming machine drives the base membrane-expanded PTFE microporous membrane to run on the bearing roller of the membrane-forming machine, the base membrane is first immersed into the low-concentration resin solution and then dried at 40-100° C., the dried base membrane continues to be immersed into the high-concentration solution and then dried at 40-100° C., and subsequently, the base membrane is repeatedly immersed in the high-concentration solution and dried until the composite membrane reaches a certain thickness, then the composite membrane is dried and sized in an oven at 120-200° C. to obtain a complete composite membrane. European Patent EP2767330 discloses a composite comprising a porous PTFE membrane for anti-icing of blades, an intermediate PTFE membrane included in the porous PTFE membrane has a pore size of about 2 nm-about 20 nm, and the porous PTFE membrane is inserted and bonded between porous fluoropolymer membranes with a large pore size. The CN101821500A patent of Denmark Vestas Wind System Co., Ltd. has invented a de-icing method of blades of a wind turbine, the wind turbine and its use method. The method is used for removing ices on the wind turbine blades after the wind turbine has been shut down for a period of time by using a method where an acceleration state is formed in the blades and subsequently a deceleration state is formed to shake ices from the blades. However, for large-size wind turbine generators, the roots of the blades are small in amplitudes, and therefore this solution is difficult to realize.

Academic and scientific research institutions and wind power industry in China have done relevant researches on prevention and removal of ices on the wind turbine blades all the time. There are hundreds of academic papers reported by disclosed documents, methods include multiple deicing forms such as machinery, solution, coating, hot gas, microwave, vibration, electric heating, ultrasonic wave. In order to prepare super-hydrophobic nano composites and research its effect on icing, Yao Gang, et al, School of electrical engineering, Wuhan University, used a method combining high-speed stirring with ultrasonic dispersion to uniformly disperse the nano $SiO_2$-x treated with a coupling agent into a fluorinated organic silicone resin having a hydrophobic property. The prepared super-hydrophobic nano composite paint is used for prevention of icing. Chinese patent 201610675902.4 discloses a preparation method and application of a PTFE and polyester based composite membrane for prevention and resistance of ices on wind power blades; the preparation method comprises laminating and compounding with a bonding compounding agent, interface adhesive application and application of photo-initiated pressure-sensitive adhesive with pressure-sensitive adhesive, wherein the bonding compounding agent is composed of 3-methyl isocyanate-3,5,5-trimethylcyclohexyl isocyanate, vinyl acetate, urethane, α-linolenic acid, benzoyl peroxide, (4) bisphenol A dimethacrylate ethoxide and the like, and the photo-initiated pressure-sensitive adhesive is composed of a poly[butyl acrylate-glycidyl methacrylate-n-butoxymethacrylamide] copolymer, butyl acrylate, (4) bisphenol A dimethacrylate ethoxide, 4,4'-bis(diethylamino) benzophenone, dimethylformamide and the like; a non-adhesion technical problem that the PTFE-based polyester composite membrane cannot be directly pasted on the surface of the wind turbine blade through an adhesion agent is solved, thereby improving the bonding and stripping strength; the prepared PTFE and polyester based composite membrane can be used for prevention and resistance of ices on various models of wind turbine blades. Chinese patent 201610670830.4 discloses a preparation method of nano modified PTFE and polyester based composite membrane for preventing ices on wind power blades and application; the preparation method comprises using a PTFE-modified membrane, a laminated compounding and applying photo-cross linking bonding adhesive, a modifier is composed of antimony doped tin oxide nano crystals, nano titanium dioxide, nano silicon carbide, organic fluorine waterproof agent, pentaerythritol tris(3-aziridinyl) propionate, the laminating and compounding agent is composed of 3-methyl isocyanate-3,5,5-trimethylcyclohexyl isocyanate, vinyl acetate, ethyl carbamate, α-linolenic acid, (2) ethoxylated bisphenol A dimethacrylate, trimethylolpropane trimethylacrylate and benzoyl peroxide; the photo-crosslinking bonding adhesive is composed of a poly[butyl acrylate-glycidyl methacrylate-n-butoxymethacrylamide]copolymer, vinyl acetate, butyl acrylate, an acrylate derivative, a photoinitiator and dimethylformamide; a problem that the modified PTFE and polyester based composite membrane cannot be directly pasted on the surface of the wind turbine blade by an adhesive agent is solved. In the paper "RESEARCH AND ANALYSIS ON ANTI-ICING TECHNOLOGY OF WIND TURBINE BLADES" published in wind energy in September 2016, the prepared nano modified PTFE membrane is bonded and compounded with polyester fabric at a high temperature under the action of a thermal rolling compound process, the prepared nano modified PTFE membrane and polyester fabric composite membrane is expected to become a new-generation anti-icing new material and technology for solving the icing of the wind turbine blades. Chinese patent 201610675902.4 discloses a preparation method of a PTFE and polyester composite membrane for prevention and resistance of ices on wind turbine blades and application; the preparation method comprises laminating and compounding with a bonding compounding agent, applying interface adhesive and applying photo-initiated pressure-sensitive adhesive with pressure-sensitive adhesive. Chinese patent 201610452541.7 discloses a self-adhesive carbon fiber and steel fiber modified polytetrafluoroethylene material and a preparation method thereof; the carbon fiber and steel fiber modified polytetrafluoroethylene material is used for prevention and resistance of ices on blades; steel fiber and carbon fiber are used to improve the tensile strength and friction performance of polytetrafluoroethylene; meanwhile, fine fillers such as $SiO_2$ and Al powder are sintered to the surface of polytetrafluoroethylene at a high temperature by using an improved melting method, thereby improving the surface sintering state of polytetrafluoroethylene, and obviously increasing the bonding strength. Chinese patent 201310018649.1 discloses a preparation method of a PTFE self-adhesive soft membrane tape for prevention and resistance of ices on blades; in the preparation method, a polytetrafluoroethylene dispersion resin is used, certain amounts of silicone and solvent oil are added and uniformly mixed, and the mixture is cured in an oven at 50° C. for more than 12 h; the cured powder is pre-compressed into a cylindrical blank; the blank is put into an extruder to obtain a round strip-like material with a diameter of 20-25 mm, and the round strip-like material is preserved in warm water, and then a membrane is pressed through a large-drum calendar; a polytetrafluoroethylene membrane tape product with excellent performance for sealing industry is finally obtained by procedures such as deoiling, transverse stretching, longitudinal stretching, longitudinal stretching and transverse stretching, sizing and slitting, which has a density range of 400-1100 g/m3 and tensile strength of 15-25 MPa. Chinese patent 201720057571.8 discloses an optically controlled thermal insulation membrane for prevention and resistance of ices on blades, which successively comprises a PET membrane, a titanium dioxide layer, a polytetrafluoroethylene membrane, a hot melt adhesive layer, a PET base membrane, a scratch-resistant layer and an infrared ray resistant layer from inside to outside. Chinese patent 201610990370.3 discloses a double-layer spinning membrane for prevention and resistance of ices on blades and a preparation method thereof; the upper layer of the anti-icing double-layer spinning membrane is a super-hydrophobic spinning membrane sprayed with a silica coating, and the lower layer is a hydrophilic spinning membrane injected with an anti-icing solution. Liu Shengxian, et al, Changsha University of technology, researched a vibration detection-based diagnosis technology of an icing state of wind turbine blades by analyzing a simulation experiment of dynamic characteristics of wind turbine blades under different icing states, defining icing state parameters of blades, simulating and calculating the characteristic value indexes of blades under the icing state. The Goldwind technology has developed an electrothermal deicing technology solution in which heating elements such as a carbon fiber electrothermal membrane or a resistance wire are embedded in the blade coating, such as carbon fiber, heating resistors, metal heating nets, a conductive heating membrane or other heating elements, and constitutes electrothermal icing prevention system together with an overheating protection converter and a power supply to melt the ice on the blade surface through electric heating temperature to achieve the icing prevention effect. Yunda wind power develops a hot gas deicing technology generated by inputting electric heating into the blade cavity. By arranging hot gas ventilation pipes in the blade cavity and adding a heating device in the wind turbine hub, the hot gas or hot gas heated by other radiation sources forms a circulation in a ventilation pipe, and the heat is transferred to the outer surface of the blade through the blade shell so that the blade has a certain temperature, the blade is indirectly heated under the action of hot gas to prevent the freezing of super-cooled water droplets and achieve the purpose of icing prevention.

To sum up, there are many technical methods for prevention and removal of ices on wind turbine blades at home and abroad, but practices show that in these technical methods, some of them are only in mechanism research, and some of them cannot achieve an ideal effect of preventing and removing ices despite they are subjected to test application. Where, especially for a method for electric heat preventing and removing ices on resistance wires and electric heat wind, besides the unobvious ice preventing and removing effect, this method increases the weight of each blade by 200 kg, the weight of the blades of the whole machine is increased by 600 kg, which increases the weight load of the wind turbine blade, the electricity consumption rate for a factory is improved by more than 8-10%. If one blade is in electric heating fault or fails to electric heat, the whole electric heating ice removing system must stop running, or else the qualities of the blades are different due to icing so as to lead to weight imbalance and serious gravity center shift to cause faults or accidents and meanwhile a safety accident that the electric heat ice preventing and removing system of the resistance wires is struck by lightning occurs.

The wind turbine blade has the characteristics that the blade is frozen and iced when encountering moist air, rain, salt spray, ice and snow and super-cooled water droplets, and the formed ice body is firm and strong in bonding force and difficultly removed, and the like. At the same time, the blade is clashed and corroded by particles such as dusts, ice crystals, hails, freezing rains and raindrops entrained in wind and rain to different degrees, especially a relatively high linear velocity of the tip of the blade when in running (a blade with a length of 51 m, the relative linear velocity of the tip is 280-300 km/h), friction of these substances on the surface of the blade, and impact of thunder arc. Therefore, the icing preventing material of the wind turbine blade has not only low surface solid tension and high lubricating property as well as ultra-low surface tension and non-adhesive performance combined with multiple nano and micron concave-convex geometric ultra-structure morphology, but also strong wear resistance, toughness resistance and impact strength.

Therefore, PTFE is recognized as having low surface solid tension and high lubrication performance, but it still cannot resist the adhesion of ice crystals on the surface of the wind turbine blade and icing is formed. This phenomenon is most serious at the leading edge of the blade, and therefore the ideal effect and purpose of completely preventing and removing icing on the surface of the wind turbine blade are not realized. If PTFE is modified, the low surface tension performance of the prepared PTFE-based membrane is greatly reduced, and then the non-adhesion function effect of preventing the ices on the blade is also significantly reduced. If PTFE is not modified, the prepared PTFE-based membrane cannot be directly and firmly pasted on the surface of the wind turbine blade.

SUMMARY

In order to solve the above problems, the disclosure provides a preparation method of a PTFE-based nano functional composite membrane, comprising the following steps:
(1) preparing the PTFE-based nano functional composite membrane through fusion polymerization and micro polymerization of monomers
1) preparing a rod by blending, pre-compressing and pushing
a PTFE resin is infiltrated with vinyl silicone oil having a PTEF softening function, the infiltrated PTFE resin is blended, and hot pre-compressing and hot pushing are performed at the temperature of 60-90° C. at the rate of 20-30 m/min under the pressure of 5-8 MPa to prepare a monomer polymerized PTFE rod material;
2) preparing the membrane by hot calendaring and fusion polymerization
the prepared PTFE rod material is subjected to fusion polymerization under the action of hot calendaring at the hot calendaring temperature of 60-90° C. at the rate of 20-30 m/min, and a part of vinyl silicone oil mixed in the PTFE resin and having a monomer polymerization effect is extruded by a hot calendaring machine to prepare the PTFE-based nano functional composite membrane with micron pores;
the PTFE-based nano-functional composite membrane has a thickness of 100-120 um and is milky white, and the surface morphology of the membrane exhibits that a micron miniature concave-convex surface structure with an average size of 20-40 um, a height of 10-20 um and a spacing of 30-50 um is uniformly distributed in a longitudinal and latitudinal direction;
3) preparing a homogeneous membrane through micro polymerization
the PTFE-based nano functional composite membrane with the micron miniature concave-convex surface structure is subjected to micro polymerization in a 180-200° C. degreasing oven at the rate of 6-8 m/min, and a part of vinyl silicone oil which is not extruded by the hot calendaring machine and mixed into the PTFE resin for monomer polymerization is polymerized under the action of temperature to be consolidated in the PTFE resin, so as to prepare a homogeneous PTFE-based nano functional composite membrane which is reeled under the action of traction caused by rotation of a roller arranged outside the degreasing oven;

(2) preparing the PTFE-based nano functional composite membrane through high-temperature high-linear pressure micro eutectics the temperature in a high-temperature high-linear pressure micro eutectic cavity is set to 70-420° C., the PTFE-based nano functional composite membrane is spread on an unpowered roller bracket in the cavity, pulled by utilizing a uniform force generated when the roller arranged outside the cavity rotates so as to be pushed forward at the rate of 6-8 m/min, the molecular chain of the membrane is shrunk through a high temperature in the cavity and eutectics are produced, and micropores become nano pores and super-micron pores, the linear pressure of the surface of the PTFE membrane is controlled to 50-80 N/m so that the width of the membrane is shrunk, the density of the membrane is improved, and the eutectic which has a shrunk membrane width and an increased density, a transparent membrane changed from the milky white membrane and uniform transparency has nano macromolecular aggregates and nano and micron concave-convex geometrical ultra-structure surface morphologies with an average surface size of 10-20 um, a height of 5-10 um and a spacing of 10-20 um; and (3) preparing the PTFE-based nano functional composite membrane through nano deep surface activation after the functional surfaces of the nano and micron concave-convex geometrical ultra-structure surface morphologies of the PTFE-based nano functional composite membrane are covered with a polyethylene (PE) membrane, the single surface of the PTFE-based nano functional composite membrane applied with a bonding adhesive is subjected to surface activation under a vacuum environment and in a nitrogen-hydrogen mixed medium atmosphere of less than 40° C. at the rate of 1.5-3 m/min so that an activated structure layer with a nano depth is formed on the sizing surface of the PTFE-based nano functional composite membrane; the bonding adhesive is applied to the surface of the membrane having the activated structure layer so that chemical bonding occurs between the characteristic group of the adhesive and the activated structure layer of the PTFE-based nano functional composite membrane to form a membrane-adhesive complex.

The technical effects are as follows: on the basis of making full use of the low surface tension performance of the PTFE material, the monomer fusion polymerization and micro polymerization technology is adopted to prepare the membrane into the multiple nano and micron concave-convex geometric ultra-structure surface morphologies so that the membrane surface has ultra-low surface tension and no adhesivity; a high-temperature high-linear pressure micro eutectic technology is used to enhance the structural strength of the membrane, so that the membrane has strong wear resistance, toughness resistance and impact resistance; a nano deep surface activation technology is used so that a chemical bonding function occurs between the membrane and the bonding adhesive, and the adhesion strength and the durability between the bonding stripping force and the bonding force are enhanced; at the same time, for the performance characteristics, application requirements and use environment of the PTFE-based membrane, the high-toughness cold pasting and bonding adhesive with a cold pasting function is "customized". The adhesive is compounded on the membrane surface with an activated structure through a membrane and adhesive compounding device for direct cold pasting and bonding, the membrane is bonded on the wind turbine blade, then the adhesive is always in a toughness state and has a high bonding strength and durable bonding and stripping force.

The technical solution further defined by the disclosure is as follows:

In the above preparation method of the PTFE-based nano functional composite membrane, the bonding adhesive is prepared and applied as follows:

0.2 kg of PVA-1788, 18 kg of butyl acrylate, 0.5 kg of acrylic acid, 1.0 kg of vinyl acetate, 1.0 kg of methyl methacrylate, 1.5 kg of silicone monomer, 0.01 kg of TO-7, 0.01 kg of dodecylbenzene sodium sulfate, 0.0 kg of benzoyl peroxide and 80 kg of water are added into a preparation tank to react for 5 h at 85° C., the resulting product is vacuumized and dewatered to prepare a tape-like pressure-sensitive tape with a solid content of 18.7%, and the pressure-sensitive tape is compounded with release paper and then reeled on a PVC pipe core;

the bonding tape is directly migrated and compounded on the membrane bonding functional surface having the activated structure layer of the PTFE-based nano functional composite membrane through a membrane-adhesive compounding device.

In the above preparation method of the PTFE-based nano functional composite membrane, the membrane-adhesive compounding device comprises a pipe core inflation shaft having a membrane and tape pulling function, 1 set of membrane-adhesive compounding compression rollers, a tape pipe core inflation shaft, a membrane tape pipe core rotating shaft and 4 membrane tape tension and finishing rotating rollers, the pipe core inflation shaft, the membrane-adhesive compounding compression rollers and the tape pipe core inflation shaft are driven by a motor, the membrane-adhesive compounding compression rollers are arranged obliquely above the pipe core inflation shaft at an included angle of 45°, a gap between 2 compression rollers is set as a total thickness after a membrane thickness is compounded with an adhesive thickness, the membrane tape pipe core rotating shaft and the membrane tape tension and finishing rotating rollers are not driven by the motor, and the membrane tape tension and finishing rotating rollers are arranged in a form of ∽-shape with two rollers upwards and the other two rollers downwards.

In the above preparation method of a PTFE-based nano functional composite membrane, before the membrane and adhesive are compounded, the membrane pipe core is sleeved on the no-motor-driven membrane tape pipe core inflation shaft, a membrane head is pulled to the PVC pipe core on the motor-driven membrane tape pipe core inflation shaft, and pasted and fixed with tape paper, the membrane is simultaneously pasted on the surfaces of the membrane tape tension and finishing rotating rollers, the tape is sleeved on the motor-driven membrane tape pipe core inflation shaft, and a section of tape is pulled to be pasted on the surface of the membrane having the activated structure layer;

when the membrane and the adhesive are compounded, the motors having the same rotating speed are set to drive the pipe core inflation shaft, the membrane-adhesive compounding compression roller and the tape pipe core inflation shaft, and the motors are synchronously started; the tape pipe core inflation shaft releases the reeled tape under the drive of the motor, and the membrane-adhesive compounded compression roller rolls and compounds the membrane and the adhesive under the drive of the motor, the pipe core inflation shaft reels the compounded membrane-adhesive composite membrane on the PVC pipe core through a traction force generated by the motor drive, and meanwhile the membrane tightly pasted on the surface of the membrane tape tension and finishing rotating roller respectively is not wrinkled under the action of a certain tension force, thereby completing the whole compounding process of the membrane and the adhesive.

Another objective of the disclosure is to provide use of a PTFE-based nano functional composite membrane. For application in in-service wind turbine blades, high-altitude membrane is pasted, the tip of the blade is perpendicular to the ground and parallel to the tower body of the wind turbine generator, the blade penetrates through the middle of a high-altitude hanging basket, the adhesion of the membrane adopts a cutting, splicing and pasting method and a winding and pasting method which are performed simultaneously by four people, one of the four people is in charge of spreading the membrane and aligning a pasting reference line, one of the four people is in charge of finishing the smoothness of the membrane when being pasted, one of the four people is in charge of eliminating air between the membrane and a blade base layer and bonding with a pasting scraper, and one of the four people is in charge of cooperation between logistics services and construction, specifically:

(1) polishing the surface of the blade the flatness and finish degree of the blade surface are treated with a hand-held polishing machine, and meanwhile a part of aged coating pasted on a base layer surface is removed, so as to meet the pasting requirement conditions of the PTFE-based nano functional composite membrane; and (2) pasting the membrane 1) cutting, splicing and pasting the tip of the blade the membrane is cut horizontally along the attack angle, deflection and curvature of the airfoil starting from the front edge of the tip of the blade according to the width of the membrane, each membrane is cut separately into a membrane conforming to the airfoil, attack angle, deflection and size, and then the cut membrane is pasted;

when the membrane is pasted, the membrane is pasted from the SS surface of the rear edge to the PS surface of the front edge, the membrane on the PS surface of the front edge must be overlapped on the membrane on the SS surface of the rear edge, the two membranes must be horizontally staggered to be overlapped and are not arranged at the same position;

2) winding and pasting when the airfoil, chord length, deflection, curvature, and angle size of the blade are suitable for winding and pasting, pasting is performed by using a manner that the membrane is horizontally wound on the blade, when the membrane is wound and pasted, the membrane is spread, the release paper on the surface is torn off, and the membrane penetrates between the clamp rollers of a membrane pasting tool, a tension force is applied to the membrane by pulling via hands, and the release paper is torn off while the membrane is wound and pasted;

the vertical and horizontal edge of the last membrane pasted on the tip of the blade is used as a winding and pasting reference line, and the membrane is slowly spread for winding and pasting by aligning the reference line, and air between the membrane and the base layer is uniformly removed using a membrane pasting scraper according to the width of the whole membrane from the starting portion to the rear of the pasted surface, namely, a membrane non-spread direction, while the membrane is forcefully and firmly pasted on the surface of the blade, and the air between the membrane and the base layer must be thoroughly removed; overlapping of the membrane on the upper layer presses the overlapping surface of the overlapping part of the membrane on the lower layer, namely, the wound and pasted membrane must be overlapped on the pasted membrane of the tip of the blade, and all the horizontal overlaps of the membrane, namely, the linkers between the membranes are all arranged on the SS surface of the rear edge of the blade;

3) treating the membrane at the lightning arrester of the blade the membrane is directly covered and pasted from the surface of the lightning arrester, before the pasting of the whole membrane is ended, the membrane covering the lightning arrester is cut and dug out one by one to expose the lightning arrester, and the membrane at the seam is compacted and flattened;

4) overlapping of the membrane and treatment of the linker whether the pasting at the overlapping position is tight is carefully checked, and if the overlapping is not tight, compaction and flattening is timely performed, so as to avoid wrinkling, bulging, blistering, and unevenness;

5) repairing the damaged membrane if the membrane is scratched during the construction, a membrane with the whole width is cut, and horizontally wound and pasted on the surface of the whole scratched part for repairing.

In the above use of the PTFE-based nano functional composite membrane, when cutting, splicing and pasting are performed on the tip of the blade, the horizontal overlapping width of the membrane (a joint of two membranes) is 150-200 mm, the edge of the pasted first membrane is used as a reference line, the second membrane is overlapped and pressed on the linker of the first membrane by 150-190 mm, and the longitudinal overlapping width of the membrane on the edge is 10-40 mm.

In the above use of the PTFE-based nano functional composite membrane, when the membrane is wound and pasted, the horizontal overlapping width of the membrane is 10-40 mm.

In the above use of the PTFE-based nano functional composite membrane, when cutting and splicing pasting and winding pasting are performed on the tip of the blade, the forceful and horizontal stretching of the membrane is forbidden to avoid the wrinkling of the membrane after being stretched, and the membrane must be pasted under a natural and smooth state.

In the above use of the PTFE-based nano functional composite membrane, when cutting and splicing pasting and winding pasting are performed on the tip of the blade and when the membrane is wrinkled and hollowed or the membrane is irregular or deformed due to no alignment of the reference line, the whole spread membrane slowly lifts until wrinkling and hollowing occur, and then the membrane is re-pasted to prevent the pasting quality of the membrane from being influenced.

The disclosure has the beneficial effects:

(1) The monomer fusion polymerization and micro polymerization method is adopted to prepare PTFE into the PTFE-based nano functional composite membrane with the multiple nano and micron concave-convex geometric ultra-structure morphologies on the basis of low surface tension and high lubricity of PTFE, so that the membrane has ultra-low surface tension, hydrophobicity, no adhesivity, high anti-fouling performance, high hydroscopicity, self-cleaning performance and the like, ices are difficultly adhered on the membrane surface, or even though adhesion is formed, the ices can automatically separated from the membrane surface due to extremely low bonding force, and then the effect and purpose of truly preventing and removing ices on the surface of the wind turbine blade are indeed achieved;

(2) The PTFE-based nano functional composite membrane is prepared through high-temperature high-linear pressure micro eutectic, which improves the wear resistance, toughness resistance, impact resistance, high strength structure surface and high membrane transparency of the PTFE-based nano functional composite membrane having the microporous nano and micron concave-convex geometric super-structure morphology in which the membrane undergoes lamellar peeling when being cracked to be in a fabric-like structure under the actions of the tensile force of the temperature and the hot calendering; under the actions of the temperature and the pressure, the linear pressure applied to the PTFE membrane changes through the change of the pressure. With the help of the fluidity of the temperature, the macromolecules in the PTFE membrane are directionally arranged and oriented to form multiple micro eutectic structures. The multiple micro eutectic molecular structures are arranged in parallel with each other and have different thermal shrinkages, resulting in the reduction in pores of the PTFE-based nano functional composite membrane, and improved and consistent transparency; while the ultra-structural surface morphology of the PTFE-based nano functional composite membrane is maintained, the membrane has high wear resistance, toughness resistance and impact resistance;

(3) The PTFE-based nano functional composite membrane is prepared through nano deep surface activation, which solves the technical problem of PTFE material bonding without any materials. In a medium atmosphere, the surface of the PTFE-based nano functional composite membrane can produce the active structure layer with the nano depth, and chemical bonding occurs between the active structure layer and the characteristic group of the adhesive, extremely strong affinity and high-strength adhesion performance are generated between the membrane and the adhesive to form the membrane and adhesive complex, thereby achieving the bonding and compounding of membrane/adhesive, the bonding and compounding of the membrane/membrane, the integration of the membrane and the adhesive base layer after bonding while improving the bonding strength and bonding stripping force of the adhesive as well as the durability of the bonding force;

(4) The bonding adhesive in the disclosure is a "customized" high-toughness cold bonding adhesive specific to performance characteristics, application requirements and use environment of the PTFE-based nano functional composite membrane, the PTFE material itself has the characteristics of direct adhesion without any adhesive materials, the PTFE-based nano functional composite membrane with nano and micron concave-convex geometric ultra-structural morphologies prepared through fusion polymerization and micro polymerization of monomers is subjected to high-temperature high-linear pressure micro eutectic to form a PTFE material having high wear resistance and transparency, in this way, it is difficult to have a suitable bonding adhesive for bonding and even good adhesion performance. The high-toughness cold bonding adhesive of the disclosure can directly used for cold bonding, has strong stripping strength, large tensile elongation at break and impact strength, relatively small hardness and tensile elastic modulus, long UV aging resistance and aging resistance time, no obvious plastic deformation property and smaller thermal expansion and cold shrinkage stress than the elastic limit of the adhesive, so that the adhesive is always in a ductile state and has high bonding strength and durable bonding stripping force, and the adhered adhesive is always in the ductile state;

(5) The PTFE-based nano functional composite membrane of the disclosure can be applied to prevention and resistance of ices on various types of wind turbine blades in winter and salt frog corrosion resistance of wind turbine blade, and meanwhile can improve the aerodynamic performance of wind turbine airfoil, enhance the overall surface strength of blades and protect blades from undergoing aging erosion, and is a new-generation multi-functional brand-new composite membrane material which can be directly explored and applied to the industrial fields of preventing adhesion and corrosion of marine fouling organisms on steel pipe piles of offshore wind power and offshore platforms, avoiding snowing and icing of high-voltage transmission towers and cables, protecting snowing and icing of bridges (stay cables and suspension cables) and the like.

DETAILED DESCRIPTION

Example 1

Figure 3A:
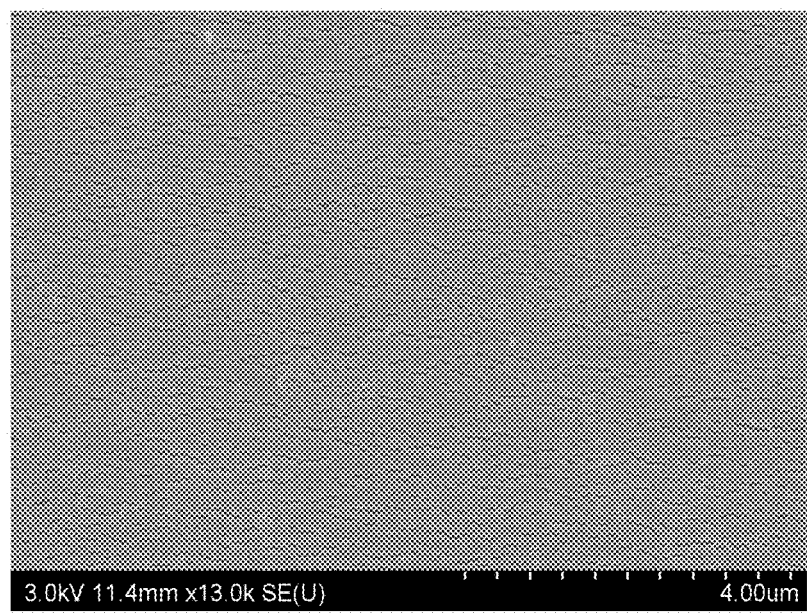
FIG. 3a and FIG. 3b show membrane surfaces before and after treatment of a nano deep active structure layer on a membrane surface under SEM.
Figure 3B:
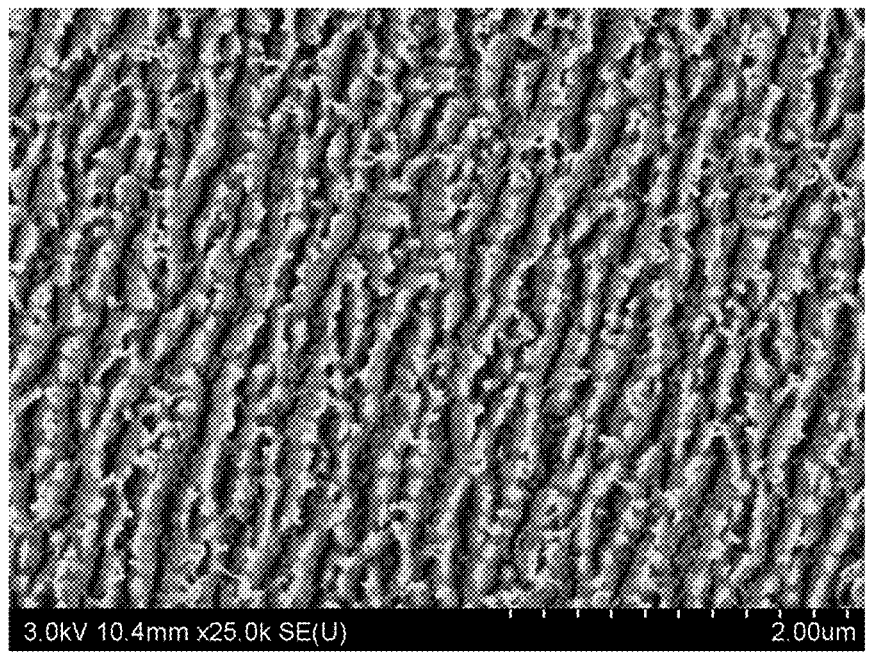

This example provides a preparation method of a PTFE-based nano functional composite membrane, comprising the following steps:

(1) preparing the PTFE-based nano functional composite membrane through fusion polymerization and micro polymerization of monomers 1) preparing a rod by blending, pre-compressing and pushing a PTFE resin was infiltrated with vinyl silicone oil having a PTEF softening function, the adopted PTFE resin was particle powder of polytetrafluoroethylene dispersed resin, and vinyl silicone oil and PTFE resin were added in a mass ratio of 3:100; the infiltrated PTFE resin was blended, and hot pre-compressing and hot pushing were performed at the temperature of 60° C. at the rate of 25 m/min under the pressure of 8 MPa to prepare a monomer polymerized 017 mm PTFE rod material, wherein the rod material also had high surface lubricity;

2) preparing the membrane by hot calendaring and fusion polymerization the prepared PTFE rod was subjected to fusion polymerized under the action of hot calendaring at the temperature of 60° C. at the rate was 25 m/min, and a part of vinyl silicone oil mixed in the PTFE resin and having monomer polymerization was extruded by a hot calendaring machine to prepare a PTFE-based nano functional composite membrane with micron pores;

the PTFE-based nano-functional composite membrane has a thickness of 100 um and a density of 2.1 kg/m3 and is milky white, and the surface morphology of the membrane exhibits that a micron miniature concave-convex surface structure with an average size of 20-40 um, a height of 10-20 um and a spacing of 30-50 um is uniformly distributed in a longitudinal and latitudinal direction;

3) preparing a homogeneous membrane through micro polymerization the PTFE-based nano functional composite membrane with the micron miniature concave-convex surface structure was subjected to micro polymerization in a 190° C. degreasing oven at the rate of 6 m/min, and a part of vinyl silicone oil which was not extruded by the hot calendaring machine and mixed into the PTFE resin for monomer polymerization was polymerized under the action of temperature to be consolidated in the PTFE resin, so as to prepare a homogeneous PTFE-based nano functional composite membrane which is reeled under the action of traction caused by rotation of a roller arranged outside the degreasing oven;

(2) preparing the PTFE-based nano functional composite membrane through high-temperature high-linear pressure micro eutectics the temperature in a high-temperature high-linear pressure micro eutectic cavity was set to 380° C., the PTFE-based nano functional composite membrane was spread on an unpowered roller bracket in the cavity, pulled by utilizing a uniform force generated when the roller arranged outside the cavity rotated so as to be pushed forward at the rate of 6 m/min, the molecular chain of the membrane was shrunk through a high temperature in the cavity and eutectics were produced, and micropores became nano pores and super-micron pores, the linear pressure of the surface of the PTFE membrane was controlled to 60 N/m so that the width of the membrane was shrunk from 260 mm to 200 mm, the membrane changed from milky white to transparent and had uniform transparency eutectics, and thus had strong wear resistance, toughness resistance and impact resistance while enhancing the rigidities of nano macromolecule aggregates and nano and micron concave-convex geometrical ultra-structure surface morphologies with an average surface size of 10-20 um, a height of 5-10 um and a spacing of 10-20 um; and (3) preparing the PTFE-based nano functional composite membrane through nano deep surface activation after the functional surfaces of the nano and micron concave-convex geometrical ultra-structure surface morphologies of the PTFE-based nano functional composite membrane were covered with a polyethylene (PE) membrane, the single surface of the PTFE-based nano functional composite membrane applied with a bonding adhesive was subjected to surface activation under a vacuum environment and in a nitrogen-hydrogen mixed medium atmosphere of less than 40° C. at the rate of 3 m/min so that an activated structure layer with a nano depth was formed on the sizing surface of the PTFE-based nano functional composite membrane; as shown in FIG. 3, the bonding adhesive was applied to the surface of the membrane having the activated structure layer so that chemical bonding occurred between the characteristic group of the adhesive and the activated structure layer of the PTFE-based nano functional composite membrane to form a membrane-adhesive complex, thereby realizing the integration of membrane/adhesive, membrane/membrane and membrane/adhesive base layer after bonding, and then solving the problem of the PTFE material bonding without any materials.

Before the membrane and the adhesive were compounded, the membrane pipe core was sleeved on the no-motor-driven membrane tape pipe core rotating shaft to pull the membrane head to the PVC pipe core on the motor-driven pipe core inflation shaft, and pasted and fixed with tape paper. The membrane was simultaneously and respectively tightly passed on the surface of the membrane tape tension and finishing rotating roller, and the tape was sleeved on the motor-driven tape pipe core inflation shaft, a section of tape was pulled out and pasted on the surface of the membrane having the activated structural layer; when the membrane and the adhesive were compounded, the motors having the same rotating speed were set to drive the pipe core inflation shaft, the membrane-adhesive compounding compression roller and the tape pipe core inflation shaft, and the motors were synchronously started; the tape pipe core inflation shaft released the reeled tape under the drive of the motor, and the membrane-adhesive compounded compression roller rolled and compounded the membrane and the adhesive under the drive of the motor, the pipe core inflation shaft reeled the compounded membrane-adhesive composite membrane on the PVC pipe core through a traction force generated by the motor drive, and meanwhile the membrane tightly pasted on the surface of the membrane tape tension and finishing rotating roller respectively was not wrinkled under the action of a certain tension force, thereby completing the whole compounding process of the membrane and the adhesive.

The preparation and application of the above adhesive were as follows:

0.2 kg of PVA-1788, 18 kg of butyl acrylate, 0.5 kg of acrylic acid, 1.0 kg of vinyl acetate, 1.0 kg of methyl methacrylate, 1.5 kg of silicone monomer, 0.01 kg of TO-7, 0.01 kg of sodium dodecylbenzene sulfonate, 0.05 kg of benzoyl peroxide and 80 kg of water were added into a preparation tank to be prepared for 5 h at the temperature of 85° C., the resulting product was vacuumized and dewatered to prepare a tape-like pressure-sensitive tape with a solid content of 18.7%, and the pressure-sensitive tape was compounded with release paper and then reeled on a PVC pipe core;

the bonding tape was directly migrated and compounded on the membrane bonding functional surface having the activated structure layer of the PTFE-based nano functional composite membrane through a membrane-adhesive compounding device. The membrane-adhesive compounding device comprises a pipe core inflation shaft having a membrane and tape pulling function, 1 set of membrane-adhesive compounding compression rollers, a tape pipe core inflation shaft, a membrane tape pipe core rotating shaft and 4 membrane tape tension and finishing rotating rollers, the pipe core inflation shaft, the membrane-adhesive compounding compression rollers and the tape pipe core inflation shaft were driven by a motor, the membrane-adhesive compounding compression rollers were arranged obliquely above the pipe core inflation shaft at an included angle of 45°, a gap between 2 compression rollers was set as a total thickness after a membrane thickness was compounded with an adhesive thickness, the membrane tape pipe core rotating shaft and the membrane tape tension and finishing rotating rollers were not driven by the motor, and the membrane tape tension and finishing rotating rollers were arranged in a form of □-shape with two rollers upwards and the other two rollers downwards.

5 samples of the PTFE membrane prepared by the above method were subjected to performance test. The results are as follows: ① the average thickness of the membrane is 100 um; ② the average weight of the membrane is 210 g/m2; ③ the bonding stripping force of the adhesive is 50N, and 180° bonding and stripping strength is 1000N/M; ④ via a 14400 h xenon lamp aging test, a freeze-thaw cycle performance test (temperature: −60° C.-150° C., and humidity: 5-98%), an ozone aging test, an ultraviolet aging test, an artificial atmosphere corrosion and sea salt solution immersion test, the average tensile strength before and after aging is 25 MPa, and the average elongation rate is >90%, without aging; ⑤ by using a method of "DETERMINATION OF WASHABILITY OF BUILDING EXTERIOR WALL COATINGS" of GB/T 9266-2009 and after 37 times/min cyclic friction for 40000 times, the surface of the membrane has no roughness, a phenomenon that the substrate is exposed due to damage is not observed, and the membrane has strong wear resistance; ⑥ a dynamic wind pressure test platform is used to simulate the wind speed of 36.9 m/s (grade 12 typhoon) to test rain erosion resistance under the dynamic wind pressure, after 1000 h strong wind speed water blowing test, there is no roughness on the surface of the membrane and the membrane has excellent rain erosion resistance; ⑦ as shown in FIG. 1, the surface morphology of the membrane is tested by SEM, the surface morphology of the membrane exhibits that a micron miniature concave-convex surface structure with an average size of 20-40 um, a height of 10-20 um and a spacing of 30-50 um is uniformly distributed in a longitudinal and latitudinal direction; ⑧ as shown in FIG. 2, the contact angle of water droplets on the surface of the membrane measured by a water contact angle tester is between 115.89° and 125.46; ⑨ the average surface roughness of the surface of the membrane measured by a surface roughness instrument is 0.18 um.

Figure 1:
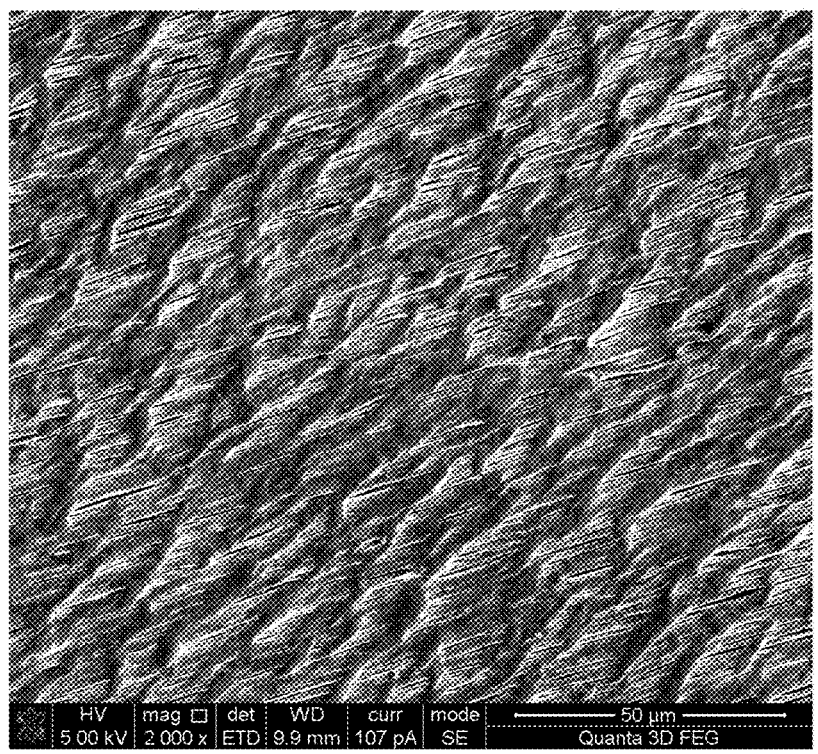
FIG. 1 shows nano and micron concave-convex geometric ultra-structure surface morphologies of a membrane surface under a scanning electron microscope (SEM)
Figure 2:
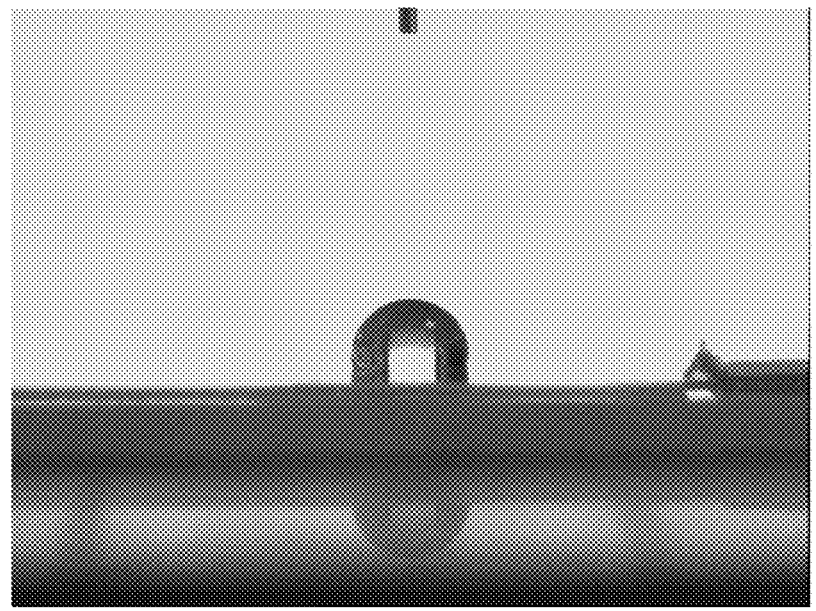
FIG. 2 shows a membrane surface-water contact angle under a KRUSS DSA-100 contact angle tester.

Therefore, the prepared PTFE-based nano functional composite membrane has the following advantages:
1) the membrane is prepared into a nano and micron concave-convex geometric ultra-structure surface morphologies without modifying PTFE, rather than achieving the no adhesivity purpose only by utilizing the lubricant low surface tension of PTFE, as shown in FIGS. 1-3, the membrane has ultra-low surface solid tension, better hydrophobicity, no adhesivity and higher antifouling, and the surface of the membrane also has the self-cleaning function, which cannot be matched with other measures and methods;
2) the membrane prepared by ultra-high temperature and high pressure has high wear resistance, toughness resistance and impact resistance, and has the functional characteristics of resisting the friction and impact of sand dust, hail, freezing rain and rain erosion and the impact of lightning arc, so that it can be used for a long time at the linear speed of 300 km/h on the tip of the wind turbine blade without being worn, and meanwhile has the characteristic of no burning, and cannot be burnt due to the impact of lightning arc;
3) the original surface color of the pasted blade is not changed;
4) the membrane has a thickness of 100 um, a weight of 210 g/m2 and a surface roughness of 0.18 um, does not increase the load of the wind turbine blade, can improve the aerodynamic performance of the blade airfoil, and increases the operation efficiency of the blade;
5) the membrane can conduct chemical bonding with the characteristic group of bonding adhesive so as to result in strong affinity and bonding strength between the adhesive and the membrane, thereby expanding the selection range of the bonding adhesive;
6) the membrane has excellent UV resistance and weather resistance of PTFE material, is equivalent to the protective coat of the blade, can enhance the strength of the surface of the blade, plays a role in overall fixation, improves the overall bearing capability and corrosion resistance of the blade, eliminates the potential safety hazards of the blade such as blade aging and cracking, and then improves the service life of the wind turbine blade.

Example 2

Figure 4A:
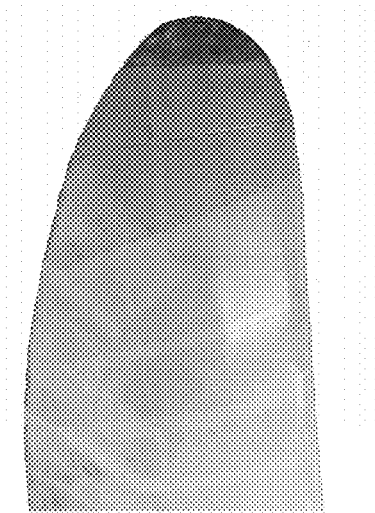
FIG. 4a-4f show an engineering application method on a wind turbine blade.
Figure 4B:
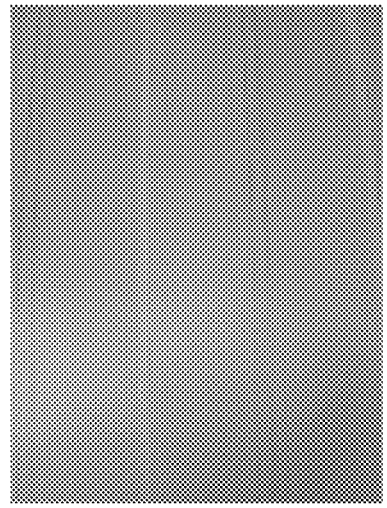
Figure 4C:
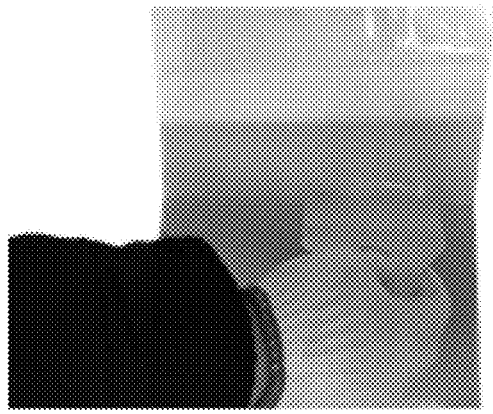
Figure 4D:
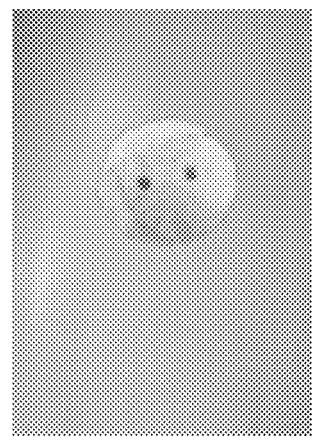
Figure 4E:
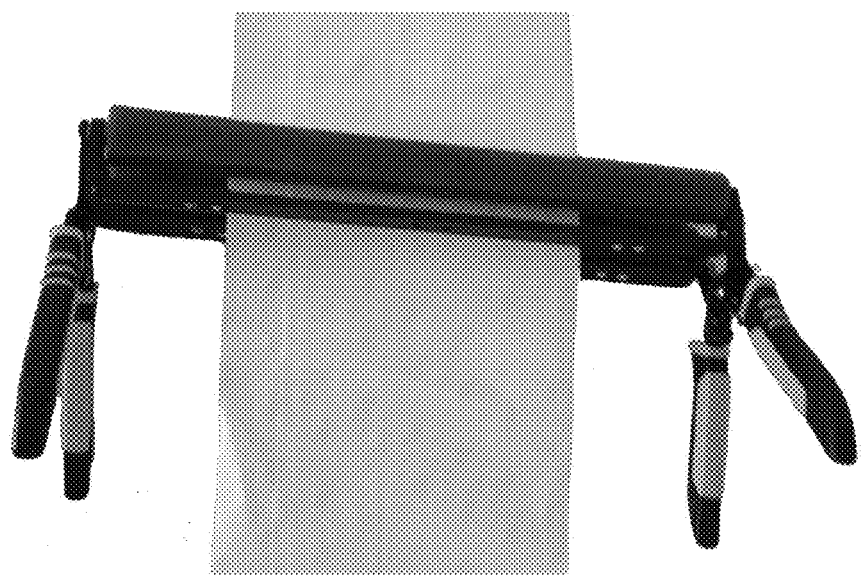
Figure 4F:
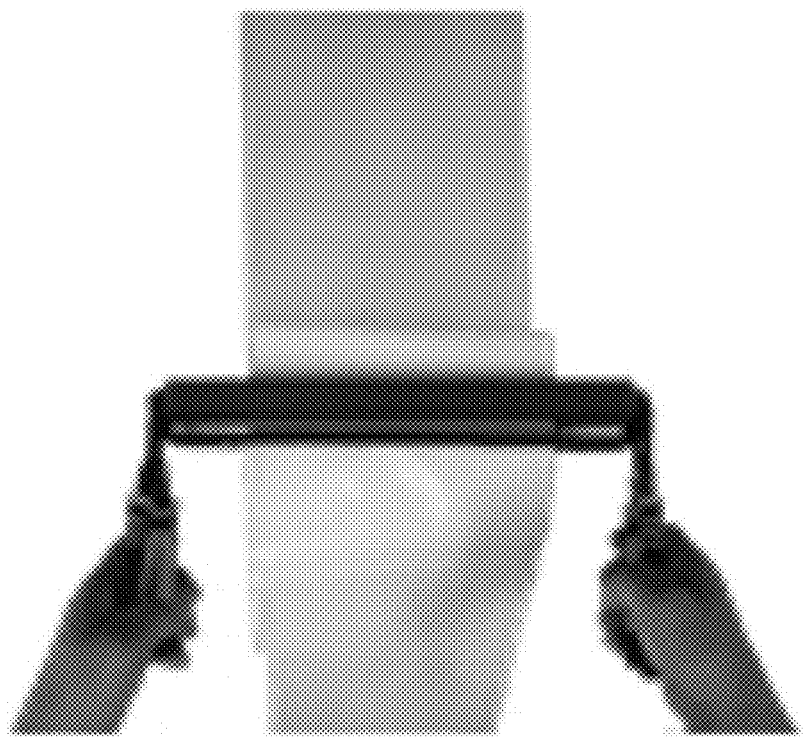

This example is application of example 1 to the operation of wind turbine blades. As shown in FIG. 4, according to the characteristics of chord length, deflection and curvature of wind turbine blade airfoil and the convenience of engineering construction, firstly, the tip of the blade was perpendicular to the ground and parallel to the tower body of the wind turbine generator, the blade penetrated through the middle of the high-altitude hanging basket. The membrane was pasted by a cutting, splicing and pasting method and a winding pasting method which were performed simultaneously by four people, one of the four people was in charge of spreading the membrane and aligning a pasting reference line, one of the four people was in charge of finishing the smoothness of the membrane when being pasted, one of the four people was in charge of eliminating air between the membrane and a blade base layer and bonding with a pasting scraper, and one of the four people was in charge of cooperation between logistics services and construction. The pasting flow process and method of the membrane is suitable for wind turbine blades that are not operated. Specifically:
(1) polishing the surface of the blade
the flatness and finish degree of the blade surface were treated with a hand-held polishing machine, and meanwhile a part of aged coating pasted on a base layer surface was removed, so as to meet the pasting requirement conditions of the PTFE-based nano functional composite membrane; and
(2) pasting the membrane
1) cutting, splicing and pasting the tip of the blade
as shown in FIG. 4a, the membrane was cut horizontally along the attack angle, deflection and curvature of the airfoil starting from the front edge of the tip of the blade according to the width of the membrane, each membrane was cut separately into a membrane conforming to the airfoil, attack angle, deflection and size, and then the cut membrane was pasted;

when pasting, the membrane was pasted from the SS surface (leeside) of the rear edge to the PS surface (windward side) of the front edge, the membrane on the PS surface of the front edge was overlapped on the membrane on the SS surface of the rear edge, the two membranes are horizontally staggered to be overlapped by 15 cm and not arranged at the same position; the membrane was overlapped in the overlapping width of 20 mm, the edge of the first pasted membrane was used as a reference line, the second membrane was overlapped on the edge of the first membrane by 10 mm, the membrane was longitudinally overlapped by 10 mm, and so on, the inverted flooding of the membrane on the blade was not formed;

2) winding and pasting as shown in FIGS. 4b and 4a, when the airfoil, chord length, deflection, curvature, and angle size of the blade were suitable for winding and pasting, the membrane was used to be pasted on the blade by means of horizontal winding at the position of the tip of the blade toward the middle by 5 m, as shown in FIGS. 4e and 4f, when the membrane was wound and pasted, the membrane was folded by 200 mm, the release paper on the surface was torn off, and the membrane penetrated between the clamp rollers of a membrane pasting tool, a tension force was applied to the membrane by pulling via hands, and the release paper was torn while the membrane was wound and pasted;

the vertical and horizontal edge of the last membrane pasted on the tip of the blade is used as a winding and pasting reference line, and the membrane was slowly spread for winding and pasting by aligning the reference line. From the starting position, air between the membrane and the base layer was uniformly removed using a membrane pasting scraper according to the width of the whole membrane from the starting portion to the rear of the pasted surface, namely, a membrane non-spread direction, while the membrane was firmly pasted on the surface of the blade, and the air between the membrane and the base layer must be thoroughly removed; overlapping of the membrane on the upper layer pressed the overlapping surface of the overlapping part of the membrane on the lower layer, namely, the wound and pasted membrane must be overlapped on the pasted membrane of the tip of the blade, and all the horizontal overlaps of the membrane, namely, the linkers between the membranes were all arranged on the SS surface of the rear edge of the blade;

3) treating the membrane at the lightning arrester of the blade as shown in FIG. 4d, the membrane was directly covered and pasted from the surface of the lightning arrester, before the whole membrane was pasted, the membrane covering the lightning arrester was cut and dug out one by one to expose the lightning arrester, and the membrane at the seam is compacted and flattened;

4) overlapping of the membrane and treatment of the linker whether the pasting at the overlapping position was tight was carefully checked, and if the overlapping was not tight, compaction and flattening was timely performed, so as to avoid wrinkling, bulging, blistering, and unevenness;

5) repairing the damaged membrane if the membrane was scratched during the construction, a membrane with the whole width was cut, and horizontally wound and pasted on the surface of the whole scratched part for repairing.

During the above membrane pasting process, the membrane is strictly forbidden to be horizontally stretched to avoid that the membrane is wrinkled after being stretched, the membrane must be pasted in a natural and smooth state. When wrinkling and hollowing occur or the membrane is not smooth or deformed without aligning the reference line, the whole membrane that is not spread should be slowly lifted to a position where wrinkling and hollowing occur, and then pasted again, so as not to affect the pasting quality of the membrane.

To sum up, the PTFE-based nano functional composite membrane prepared according to the disclosure has the ultra-low surface tension of the ultra-fine surface structure morphology as well as adhesion resistance, fouling retardance, hydrophobicity, moisture absorption resistance and self-cleaning functions; the PTFE-based nano functional composite membrane has ultra-high wear resistance strength and toughness resistance as well as wear resistance, impact resistance and rain erosion resistance functions; the PTFE-based nano functional composite membrane has chemical corrosion resistance, is able to resist corrosion, high and low temperature, aging, chemical property, ultraviolet and fatigue and enhancing the surface strength of the wind turbine blade, plays a role in integral fixation, thereby improving the overall bearing capability and corrosion resistance capability of the blades, eliminating potential safety hazards such as blade aging and cracking, enhancing the capability of the blade resisting long-term corrosion of foreign objects, dually protecting the blades and prolonging the service life of the blades; the PTFE-based nano functional composite membrane has electric insulating property and noninflammability, is capable of resisting high voltage of 15000 V, and has high temperature resistance characteristic, the surface of the membrane has no traces when being stroke by lightning arc, and even the membrane is not burnt; the PTFE-based nano functional composite membrane has ultra-thin thickness, ultra-light weight and ultra-low surface roughness, and can improve the aerodynamic performance of the airfoil and improve the use efficiency of wind energy; the self-adhesive cold pasting function facilitates the application on the wind turbine blades.

The PTFE-based nano functional composite membrane can be applied to prevention and resistance of icing of blades of various types of wind turbine generators in winter and salt spray corrosion resistance of wind turbine blades, and meanwhile can improve the aerodynamic performance of wind turbine airfoils, enhance the whole surface strength of the blade and protect the blade from undergoing aging erosion, and is a new-generation multi-functional brand-new composite membrane material which can be directly explored and applied to the industrial fields of steel pipe piles of offshore wind power and offshore platforms against adhesion and corrosion from marine fouling organisms, high-voltage transmission towers and cables against snowing and icing, bridges (stay cables and suspension cables) against snowing and icing and the like.

In addition to the above examples, other embodiments can also belong to the disclosure. Technical solutions formed by equivalent replacements or equivalent transformations are all included within the protective scope of the disclosure.

The invention claimed is:

1. A preparation method of a polytetrafluoroethylene (PTFE)-based nano functional composite membrane, comprising the following steps:
   (1) preparing the PTFE-based nano functional composite membrane through polymerization of monomers; wherein,
   1) preparing a rod by blending, pre-compressing and pushing; wherein,
   a PTFE resin is infiltrated with vinyl silicone oil having a PTFE softening function, the infiltrated PTFE resin is blended, and hot pre-compressing and hot pushing are performed at a temperature of 60-90° C. at a rate of 20-30 m/min under a pressure of 5-8 MPa to prepare a monomer polymerized PTFE rod material;
   2) preparing the membrane by hot calendering and polymerization, wherein,
   the prepared PTFE rod material is subjected to a polymerization under an action of hot calendering at a temperature of 60-90° C. at a rate of 20-30 m/min, and a part of vinyl silicone oil mixed in the PTFE resin and having a monomer polymerization effect is extruded by a hot calendering machine to prepare the PTFE-based nano functional composite membrane with micron pores;
   the PTFE-based nano-functional composite membrane has a thickness of 100-120 micrometer and is milky white, and a surface morphology of the membrane exhibits that a micron miniature concave-convex surface structure with an average size of 20-40 micrometer, a height of 10-20 micrometer and a spacing of 30-50 micrometer is uniformly distributed in a longitudinal and latitudinal direction; and
   3) preparing a homogeneous membrane through miere a polymerization, wherein,
   the PTFE-based nano functional composite membrane with the micron miniature concave-convex surface structure is subjected to the polymerization in a 180-200° C. degreasing oven at a rate of 6-8 m/min, and a part of vinyl silicone oil which is not extruded by the hot calendering machine and mixed into the PTFE resin for monomer polymerization is polymerized under an action of temperature to be consolidated in the PTFE resin, so as to prepare a homogeneous PTFE-based nano functional composite membrane which is reeled under an action of traction caused by rotation of a roller arranged outside the degreasing oven;
   (2) preparing the PTFE-based nano functional composite membrane through high-temperature high-linear pressure micro eutectics; wherein,
   a temperature in a high-temperature high-linear pressure micro eutectic cavity is set to 70-420° C., the PTFE-based nano functional composite membrane is spread on an unpowered roller bracket in the cavity, pulled by a uniform traction force caused by rotation of the roller arranged outside the cavity to be pushed forward at a rate of 6-8 m/min, a molecular chain of the membrane is shrunk through the high temperature in the cavity and eutectics are produced, and micropores become nano pores and micron pores, a linear pressure of the surface of the PTFE membrane is controlled to 50-80 N/m so that a width of the membrane is shrunk, a density of the membrane is improved, and the eutectic which has a shrunk membrane width and an increased density, a transparent membrane changed from the milky white membrane and uniform transparency has nano macromolecular aggregates and nano and micron concave-convex geometrical structure surface morphologies with an average surface size of 10-20 micrometer, a height of 5-10 micrometer and a spacing of 10-20 micrometer; and
   (3) preparing the PTFE-based nano functional composite membrane through nano deep surface activation; wherein,
   after functional surfaces of the nano and micron concave-convex geometrical structure surface morphologies of the PTFE-based nano functional composite membrane are covered with a polyethylene (PE) membrane, a single surface of the PTFE-based nano functional composite membrane applied with a bonding adhesive is subjected to surface activation under a vacuum environment where a nitrogen-hydrogen mixed medium atmosphere of less than 40° C. is provided at a rate of 1.5-3 m/min so that an activated structure layer with a nano depth is formed on a sizing surface of the PTFE-based nano functional composite membrane; the bonding adhesive is applied to the surface of the membrane having the activated structure layer so that chemical bonding occurs between a characteristic group of the adhesive and the activated structure layer of the PTFE-based nano functional composite membrane to form a membrane-adhesive complex.

2. The preparation method of a PTFE-based nano functional composite membrane according to claim 1, wherein 0.2 kg of PVA-1788, 18 kg of butyl acrylate, 0.5 kg of acrylic acid, 1.0 kg of vinyl acetate, 1.0 kg of methyl methacrylate, 1.5 kg of silicone monomer, 0.01 kg of TO-7, 0.01 kg of dodecylbenzene sodium sulfate, 0.0 kg of benzoyl peroxide and 80 kg of water are added into a preparation tank to react for 5 h at 85° C., a resulting product is vacuumized and dewatered to obtain the bonding adhesive with a solid content of 18.7%, and the bonding adhesive is complexed on a release paper and then reeled on a PVC. pipe core to prepare a bonding tape;
the bonding tape is directly migrated and compounded on the membrane bonding functional surface having the activated structure layer of the PTFE-based nano functional composite membrane through a membrane-adhesive compounding device.

3. The preparation method of a PTFE-based nano functional composite membrane according to claim 2, wherein the membrane-adhesive compounding device comprises a pipe core inflation shaft having a membrane and tape pulling function, 1 set of membrane-adhesive compounding compression rollers, a tape pipe core inflation shaft, a membrane tape pipe core rotating shaft and 4 membrane tape tension and finishing rotating rollers, the pipe core inflation shaft, the membrane-adhesive compounding compression rollers and the tape pipe core inflation shaft are driven by a motor, the membrane-adhesive compounding compression rollers are arranged obliquely above the pipe core inflation shaft at an included angle of 45°, a gap between 2 compression rollers is set as a total thickness after a membrane thickness is compounded with an adhesive thickness, the membrane tape pipe core rotating shaft and the membrane tape tension and finishing rotating rollers are not driven by the motor.

4. The preparation method of a PTFE-based nano functional composite membrane according to claim 3, wherein before the membrane and adhesive are compounded, the membrane pipe core is sleeved on the no-motor-driven membrane tape pipe core inflation shaft, a membrane head is pulled to the PVC pipe core on the motor-driven membrane tape pipe core inflation shaft, and pasted and fixed with tape paper, the membrane is simultaneously and respectively tightly pasted on the surface of the membrane tape tension and finishing rotating roller, the tape is sleeved on the motor-driven membrane tape pipe core inflation shaft, and a section of tape is pulled to be pasted on the surface of the membrane having the activated structure layer;

when the membrane and the adhesive are compounded, the motors having the same rotating speed are set to drive the pipe core inflation shaft, the membrane-adhesive compounding compression roller and the tape pipe core inflation shaft, and the motors are synchronously started; the tape pipe core inflation shaft releases the reeled tape under a drive of the motor, and the membrane-adhesive compounded compression roller rolls and compounds the membrane and the adhesive under the drive of the motor, the pipe core inflation shaft reels the compounded membrane-adhesive composite membrane on the PVC pipe core through a traction force generated by the motor drive, and meanwhile the membrane tightly pasted on the surface of the membrane tape tension and finishing rotating roller respectively is not wrinkled under an action of a certain tension force, thereby completing a whole compounding process of the membrane and the adhesive.

5. A method of applying a PTFE-based nano functional composite membrane prepared according to claim 1 to an in-service wind turbine blade, wherein, a tip of the blade is perpendicular to a ground and parallel to a tower body of a wind turbine generator, the blade penetrates through a middle of a high-altitude hanging basket, the membrane is pasted by adopting a cutting, splicing and pasting method and a winding and pasting method, the two methods are performed simultaneously by four people, one of the four people is in charge of spreading the membrane and aligning a pasting reference line, one of the four people is in charge of finishing the smoothness of the membrane when being pasted, one of the four people is in charge of eliminating air between the membrane and a blade base layer and bonding with a pasting scraper, and one of the four people is in charge of cooperation between logistics services and construction, specifically comprising:

(1) polishing a surface of the blade; wherein,
a flatness and finish degree of the blade surface are treated with a hand-held polishing machine, and meanwhile a part of aged coating pasted on the base layer surface is removed, so as to meet bonding requirement conditions of the PTFE-based nano functional composite membrane; and (2) pasting the membrane; wherein,
1) cutting, splicing and pasting the tip of the blade, wherein,
the membrane is cut horizontally along an attack angle, deflection and curvature. of an airfoil starting from a front edge of the tip of the blade according to the width of the membrane, each membrane is cut separately into a membrane conforming to the airfoil, attack angle, deflection and size, and then the cut membrane is pasted;
when the membrane is pasted, the membrane is pasted from SS surface of a rear edge to PS surface of the front edge, the membrane on PS surface of the front edge must be overlapped on the membrane on SS surface of the rear edge, and the two membranes must be horizontally staggered to be overlapped and are not arranged at a same position;

2) winding and pasting, wherein,
when the airfoil, chord length, deflection, curvature, and angle size of the blade are suitable for winding and pasting, and pasting is performed by using a manner that the membrane is horizontally wound on the blade, when the membrane is wound and pasted, the membrane is spread, a release paper on the surface is torn off, and the membrane penetrates between clamp rollers of a membrane pasting tool, a tension force is applied to the membrane by pulling via hands, and the release paper is torn off while the membrane is wound and pasted;

a vertical and horizontal edge of a last membrane pasted on the tip of the blade is used as a winding and pasting reference line, and the membrane is slowly spread by aligning a reference line for winding and pasting, and air between the membrane and the base layer is uniformly removed using a membrane pasting scraper according to the width of the whole membrane starting from a starting portion to a rear of the pasted surface, namely, a membrane non-spread direction, while the membrane is forcefully and firmly pasted on the surface of the blade, and the air between the membrane and the base layer must be thoroughly removed; overlapping of the membrane on the upper layer presses an overlapping surface of overlapping part of the membrane on the lower layer, namely, the wound and pasted membrane must be overlapped on the pasted membrane of the tip of the blade, and all horizontal overlaps of the membrane, namely, linkers between the membranes are all arranged on the SS surface of the rear edge of the blade;

3) treating the membrane at a lightning arrester of the blade, wherein,
the membrane is directly covered and pasted from a surface of the lightning arrester, before the pasting of the whole membrane is ended, the membrane covering the lightning arrester is cut and dug out one by one to expose the lightning arrester, and the membrane at a seam is compacted and flattened;

4) overlapping of the membrane and treatment of the linker, wherein,
whether the pasting at the overlapping position is tight is carefully checked, and if the overlapping is not tight, compaction and flattening is timely performed so as to avoid. wrinkling, bulging, blistering, and unevenness;

5) repairing a damaged membrane, wherein,
if the membrane is scratched during construction, a membrane with a whole width is cut, and horizontally wound and pasted on a surface of the whole scratched part for repairing.

6. The method according to claim 5, wherein when cutting, splicing and pasting are performed on the tip of the blade, a horizontal overlapping width of the membrane (a joint of two membranes) is 150-200 mm, an edge of the pasted first membrane is used as a reference line, a second membrane is overlapped and pressed on the linker of a first membrane by 150-190 mm, and a longitudinal overlapping width of the membrane on the edge is 10-40 mm.

7. The method according to claim 5, wherein when the membrane is wound and pasted, the horizontal overlapping width of the membrane is 10-40 mm.

8. The method according to claim 5, wherein when cutting, splicing, pasting, or winding pasting are performed on the tip of the blade, a forceful and horizontal stretching of the membrane is forbidden to avoid the wrinkling of the membrane after being stretched, and the membrane must be pasted under a natural and smooth state.

9. The method according to claim 5, wherein when cutting, splicing, pasting, or winding pasting are performed on the tip of the blade and when the membrane is wrinkled and hollowed or the membrane is irregular or deformed due to no alignment of the reference line, the whole non-spread membrane slowly lifts until wrinkling and hollowing occur, and then the membrane is re-pasted to prevent a pasting quality of the membrane from being influenced.

10. A method of applying a PTFE-based nano functional composite membrane prepared according to claim 1 in a wind turbine blade factory to a blade which is not operated.

* * * * *